(12) United States Patent
Siddiqui

(10) Patent No.: US 10,645,069 B2
(45) Date of Patent: *May 5, 2020

(54) LOCATION SERVICE FOR USER AUTHENTICATION

(71) Applicant: Amazon Technologies, Inc., Seattle, WA (US)

(72) Inventor: Ahmed Fuad Siddiqui, Everett, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/894,651

(22) Filed: Feb. 12, 2018

(65) Prior Publication Data

US 2018/0167376 A1 Jun. 14, 2018

Related U.S. Application Data

(63) Continuation of application No. 15/162,261, filed on May 23, 2016, now Pat. No. 9,894,052, which is a continuation of application No. 14/034,437, filed on Sep. 23, 2013, now Pat. No. 9,350,717.

(51) Int. Cl.
| | |
|---|---|
| *H04L 29/06* | (2006.01) |
| *H04W 4/80* | (2018.01) |
| *H04W 12/10* | (2009.01) |
| *H04W 12/06* | (2009.01) |
| *H04W 12/00* | (2009.01) |

(52) U.S. Cl.
CPC ............ *H04L 63/08* (2013.01); *H04L 63/107* (2013.01); *H04W 4/80* (2018.02); *H04W 12/06* (2013.01); *H04W 12/10* (2013.01); *H04W 12/00503* (2019.01)

(58) Field of Classification Search
CPC ........ H04L 63/08; H04L 63/107; H04W 4/80; H04W 12/10; H04W 12/06; H04W 12/00503
See application file for complete search history.

(56) References Cited

U.S. PATENT DOCUMENTS

| | | | |
|---|---|---|---|
| 6,101,380 A | 8/2000 | Sollee | |
| 7,024,552 B1 | 4/2006 | Caswell et al. | |
| 7,360,248 B1 * | 4/2008 | Kanevsky | G06F 21/31 |
| | | | 726/21 |
| 7,574,606 B1 | 8/2009 | Fan et al. | |
| 7,805,128 B2 | 9/2010 | Bentley et al. | |

(Continued)

OTHER PUBLICATIONS

Jansen et al., "A Location-Based Mechanism for Mobile Device Security", 2009, IEEE Computer Society, pp. 99-104. (Year: 2009).*

(Continued)

*Primary Examiner* — Matthew Smithers
(74) *Attorney, Agent, or Firm* — Davis Wright Tremaine LLP

(57) ABSTRACT

A method and apparatus for location authentication of the user are disclosed. In the method and apparatus, the location of the user is authenticated if one or more conditions for geographic proximity associated with two or more devices of the user are satisfied. Upon the location of the user being authenticated, the user may be granted access to a service.

21 Claims, 7 Drawing Sheets

(56) References Cited

U.S. PATENT DOCUMENTS

| | | |
|---|---|---|
| 8,090,351 B2 | 1/2012 | Klein |
| 8,285,639 B2 | 10/2012 | Eden et al. |
| 8,295,898 B2 | 10/2012 | Ashfield et al. |
| 8,627,422 B2 | 1/2014 | Hawkes et al. |
| 8,700,003 B2 | 4/2014 | Klein |
| 8,810,365 B2 | 8/2014 | Grover |
| 8,824,372 B2 | 9/2014 | Hoggan et al. |
| 8,904,496 B1 | 12/2014 | Bailey et al. |
| 9,037,111 B2* | 5/2015 | West ............... G06F 21/44 455/411 |
| 9,094,817 B2 | 7/2015 | Brassil et al. |
| 9,098,688 B1 | 8/2015 | Jackson |
| 9,119,068 B1 | 8/2015 | Hubble |
| 9,122,853 B2 | 9/2015 | Thompson |
| 9,160,754 B2 | 10/2015 | Cao et al. |
| 9,350,717 B1 | 5/2016 | Siddiqui |
| 2010/0153733 A1* | 6/2010 | Heffez ............... H04L 63/107 713/176 |
| 2011/0320119 A1* | 12/2011 | Jerez Morales ....... G01C 21/20 701/516 |
| 2013/0047233 A1* | 2/2013 | Fisk ............... G06F 21/6245 726/7 |
| 2013/0132568 A1* | 5/2013 | Dankar ............... H04W 8/00 709/224 |
| 2013/0288706 A1 | 10/2013 | Yu et al. |
| 2013/0308778 A1* | 11/2013 | Fosmark ............. H04L 63/0823 380/270 |
| 2013/0311768 A1* | 11/2013 | Fosmark ............. G06Q 20/3223 713/155 |
| 2014/0096180 A1 | 4/2014 | Negi et al. |
| 2014/0157381 A1 | 6/2014 | Disraeli |
| 2014/0253390 A1 | 9/2014 | Alpert et al. |
| 2014/0289821 A1 | 9/2014 | Wilson |
| 2014/0289822 A1 | 9/2014 | Wilson |
| 2014/0342667 A1* | 11/2014 | Aarnio ............... H04W 12/06 455/41.2 |
| 2015/0038114 A1* | 2/2015 | Low ............... H04L 63/107 455/411 |

OTHER PUBLICATIONS

Bertino et al., "Location-Aware Authentication and Access Control-Concepts and Issues", 2009, IEEE Computer Society, pp. 10-15. (Year: 2009).*

* cited by examiner

LOCATION SERVICE FOR USER AUTHENTICATION

CROSS-REFERENCE TO RELATED APPLICATIONS

This application is a continuation of U.S. patent application Ser. No. 15/162,261, filed May 23, 2016, entitled "LOCATION SERVICE FOR USER AUTHENTICATION," which is a continuation of U.S. patent application Ser. No. 14/034,437, filed Sep. 23, 2013, entitled "LOCATION SERVICE FOR USER AUTHENTICATION," which are hereby incorporated in their entirety by reference.

BACKGROUND

Internet services, such as e-mail services and online banking services, require user authentication prior to providing the user with access to services. The predominant form of user authentication utilized by service provider has been based on verifying user credentials, whereby a user supplies pre-set credentials to the service provider and the service provider authenticates the user based on matching the provided credentials to a record kept by the service provider. However, despite best efforts to avoid such events, the passwords and other credentials may be stolen or otherwise compromised, and possibly may be used to illegitimately access various accounts of users. To complicate matters, in many contexts, users often utilize passwords and, generally, passcodes that have semantic meaning or, generally, are easy to guess. The use of such passwords effectively reduces the space of passwords to be searched in a cryptographic attack. Such use of single factor authentication, therefore, can lack adequate safeguards to prevent unauthorized access to data and/or other resources whose access is controlled via authentication mechanisms.

BRIEF DESCRIPTION OF THE DRAWINGS

Various embodiments in accordance with the present disclosure will be described with reference to the drawings, in which.

DETAILED DESCRIPTION

Figure 1:
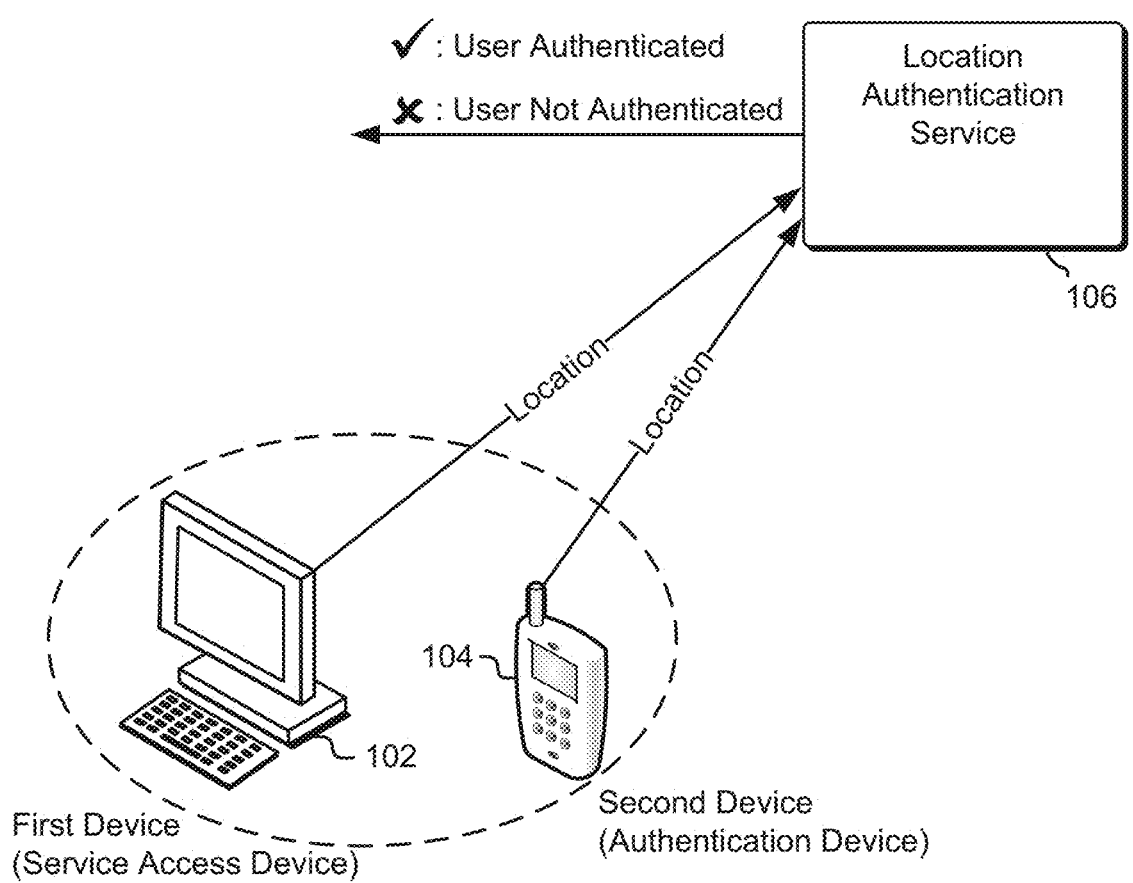
FIG. 1 shows an example of user authentication in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include authenticating a user based at least in part on a location associated with the user or a location associated with one or more devices of the user. Location authentication includes comparing the location of two or more user devices to determine whether the two devices share a similar location or may be said to be on or near the user or on or near the user's person. For the user to be authenticated, the user may be required to retain two or more devices in the same geographic location or geographic area or within a geographic proximity to one another. Performing location authentication may be an additional layer of security for ensuring that user access is not compromised. Further, location authentication may be compliment or replace credentials-based authentication, whereby access to a service is conditional upon correct user credentials (such as, username, password, data of birth, or answers to security questions, among others) being provided to the service.

Location-based authentication may be performed by a party other than the service to which access is sought. As described herein, location-based authentication may be performed by a location authentication service that is decoupled from the service to which access is sought. Accordingly, when user credentials are compromised or stolen from the service to which access is sought, location-based authentication is separately safe-guarded by the location authentication service.

As described herein, a user may have a plurality of device, whereby one device of the plurality of devices may be a service access device using which the user may access a service, such as an e-mail account, an electronic banking account or a social networking account, among others. Further, another device of the plurality of devices may be a location authentication device, which the user may be required to retain within a geographic proximity of the service access device in order for the user to be authenticated for access to the service. For example, the user may be required to retain the location authentication device within a radius of 10 feet of the service access device while the user is being authenticated for access to the service. To gain access to the service or to the user's account with the service, the user may submit their credentials to the service and the service may authenticate the credentials. Following authenticating the user's credentials, the service may initiate location authentication as an added security measure for permitting the user to access the service or the user's account with the service.

Upon receiving the user's credentials for accessing the service, the service may identify the location of the device used to request access to the service (or the service access device). The location of the device may be determined using a geo-location functionality of a web-browser, such as a hypertext markup language 5 (HTML5) enabled browser. The service may request the location of the device from the browser and receive the location from the browser. The service may then send a message, such as an application programming interface (API) function call, to the location authentication service requesting the location authentication service to authenticate the user. The service may further identify the service and indicate an account of the user with the service or an account of the user with the location authentication service. In addition, the service may indicate the identified location of the service access device. As described herein, the location of the service access device may be used for the user's location authentication.

Upon receiving the request, the location authentication service initiates location authentication of the user. The location authentication service identifies a second user device (for example, a location authentication device) to be used for authenticating the user. As described herein, the location authentication device may have been previously verified for usage in authenticating the user. To identify the location authentication device, the location authentication service may maintain a profile associated with the user. The profile may include an indication of services the user may access and for which location authentication may be performed to facilitate the access. Further, the profile may indicate user devices that are verified to be location authentication devices. Each service, which the user may access or which may request location authentication of the user, may be associated with one or more location authentication devices of the user. The location authentication service may base identifying the location authentication device at least in part on the request received from the service or associated information received from the service, such as the user's account with the service or the user's account with the location authentication service.

The location authentication service may then identify the location of the location authentication device. In some embodiments, the location authentication device may include global positioning system (GPS) circuitry and may be able to determine its location by the tuple: [longitude, latitude, altitude]. The location authentication service may request the location of the device and the device may send its location to the location authentication service. Alternatively, the location authentication service may determine the location of the location authentication device based at least in part on an HTML5 browser of the device.

Having received the location of the service access device and identified the location of the location authentication device, the location authentication service may compare the locations of the two devices and determine whether one or more criteria for authenticating the user are met. At least one criterion may be that the location of the authentication device is within a geographic boundary surrounding the location of the service access device or vice-versa. Further, another criterion may be that the location of the authentication device is within a pre-specified distance or a radius (for example, 10 feet) of the location of the service access device or vice-versa. If at least one of the one or more criteria is met or if a correspondence between the locations of the devices is determines, the user may be authenticated based at least in part on the location of the devices and the service may grant access to the user given that the location of the service access device is within a geographic proximity to the location of the location authentication device.

If the user is authenticated, the location authentication service may send a message (for example, an acknowledgement) to the service indicating that the location of the user has been authenticated. If, on the other hand, the user is not authenticated, the location authentication service may send a message (for example, a non-acknowledgement) to the service indicating that the location of the user has not been authenticated. If the user is associated with more than one location authentication device, the location authentication service may attempt to authenticate the user based at least in part on the location of the more than one location authentication devices. The location authentication service may determine that the user is authenticated based at least in part on the location of one, more than one or all of the location authentication devices.

Prior to designating a user device as a location authentication device, the user device may be verified as being a device of the user. Verifying the device as being a device of the user may include receiving from the device a request to designate the device for usage in location identification as described herein. Further, the verifying may include receiving a security code from the service and comparing the security code received from the service with a security code received from the device to determine whether a correspondence exists between the security codes. The security codes may correspond to one another if they are matching or if they meet a pre-specified criterion. The security code may be a security token, such as a temporary security token. Further, verifying the device may include comparing the location of the device with a location received from the service and determining whether a correspondence exists between the locations. The location received from the service may be a location of the service access device.

FIG. 1 shows an example of user authentication in accordance with at least one embodiment. A user has first device 102 and a second device 104. The user or a third service may initiate user authentication based at least in part on the location of the first device 102 and the locations of the second 104. The user may be required to have the first device 102 and the second device 104 within a specified geographic proximity in order for the user to be authenticated. To perform user authentication, a location authentication service 106 may be utilized. The location authentication service 106 receives an indication of the location of the first device 102 and an indication of the location of the second device 104. Although the locations are shown to be received from devices in FIG. 1, the locations of the devices may be determined otherwise, for example, the locations may be received from another service.

The location authentication service 106 may be configured with one or more location criteria for determining whether the user may be authenticated. The criteria may include a distance between the two devices 102, 104 or a determination as to whether either device 102, 104 is within a certain geographic area or region. Upon satisfaction of one or more location-related criteria, the user is authenticated. If, however, one or more criteria are not satisfied, the user is not authenticated. Further, prior to performing location-based authentication, a random string (for example, as encoded in a Quick Response (QR) code) may be shared between the first device 102 and the second device 104, whereby a camera-enabled second device 104 may capture a snapshot of the QR shown on a screen of the first device 102. Information encoded in the QR code may be relayed to the location authentication service 106 by the second device 104 (and/or other entities) to complete registration.

Figure 2:
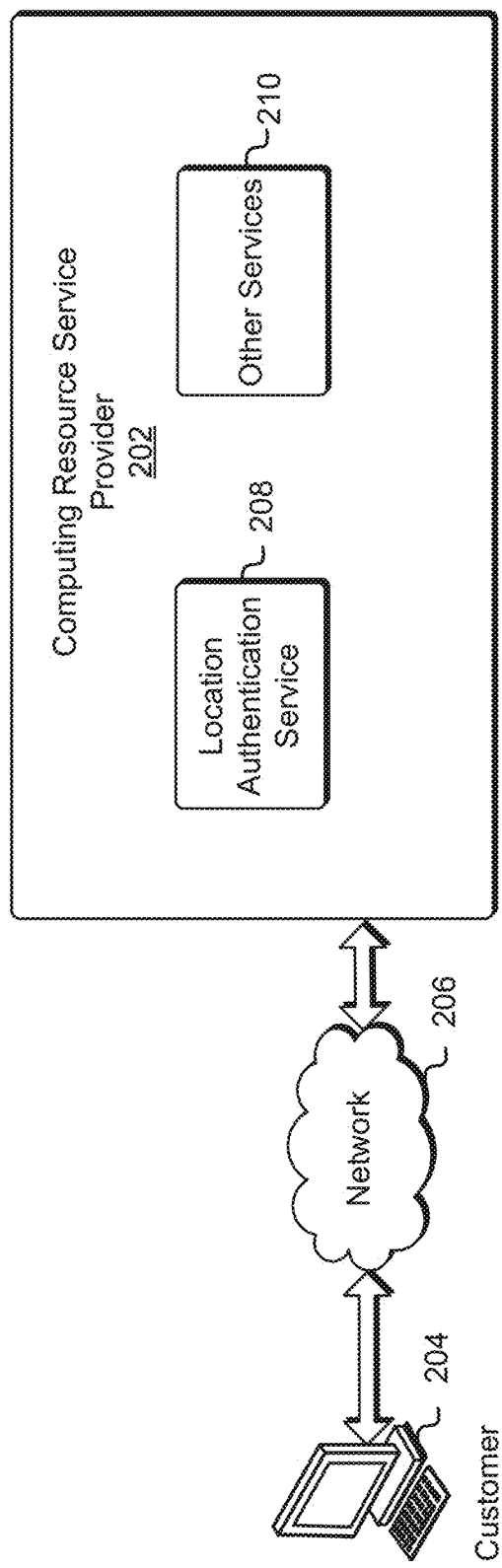
FIG. 2 shows a customer connected to a computing resource service provider offering a plurality of services in accordance with at least one embodiment.

FIG. 2 shows a customer connected to a computing resource service provider offering a plurality of services in accordance with at least one embodiment. The computing resource service provider 202 may provide a variety of services to the customer 204. The customer 204 may be a service that provides electronic or network-based functionalities or tools to a user. The service may be a social networking service, an e-mail service or an electronic banking service. The customer 204 may also be an organization that may utilize one or more of the services provided by the computing resource service provider 202 to maintain and deliver information to its employees, which may be located in various geographic locations. Additionally, the customer 204 may be an individual that utilizes the services of the computing resource service provider 202 to deliver content to a working group located remotely. As shown in FIG. 2, the customer 204 may communicate with the computing resource service provider 202 through a network 206, whereby the network may be a communication network, such the Internet, an intranet or an Internet service provider (ISP) network. Some communications from the customer 204 to the computing resource service provider 202 may cause the computing resource service provider 202 to operate in accordance with one or more embodiment described herein or a variation thereof.

The computing resource service provider 202 may provide various computing resource services to its customers. The services provided by the computing resource service provider 202, in this example, include a location authentication service 208 and one or more other services 210. It is noted that not all embodiments described herein include the services 208, 210 of the computing resource service provider 202 and additional services may be provided in addition to or as an alternative to services explicitly described herein. Further, while the location authentication service 208 is shown to be a part of the computing resource service provider 202, only a portion of the location authentication service 208 may be within the computing resource service provider 202 and in various embodiments, the location authentication service 208 may not be part of the computing resource service provider 202 and may reside outside the computing resource service provider 202. Each of the services may include one or more interfaces, such as web services interface, that enable the customer 204 to submit appropriately configured API calls to the various services through web service requests. In addition, each of the services may include one or more interfaces that enable the services to access each other.

The location authentication service 208 may provide location authentication services to the customer 204. The location authentication services may be used by the customer 204 to authenticate users of one or more services of the customer 204. Authentication may include authenticating a user based at least in part on a location associated with the user or a location of one or more of the user's devices. The authentication service provided by the location authentication service 208 may supplement authentication performed by the customer 204. For example, the customer 204 may perform authentication based at least in part on user credentials and may use location authentication in addition of or in place of credential authentication. The other services 210 provided by the computing resource service provider 202 may include, as illustrative examples, a virtual computer system service and a block-level data storage service. In addition to or instead of providing location authentication services to the customer 204, the location authentication service 208 may perform location authentication for other services of the computing resource service provider 202. For example, the location authentication service 208 may be used to authenticate access to any one of the other services 210 of the computing resource service provider 202, such as the virtual computer system service or the block-level data storage service.

Figure 3:
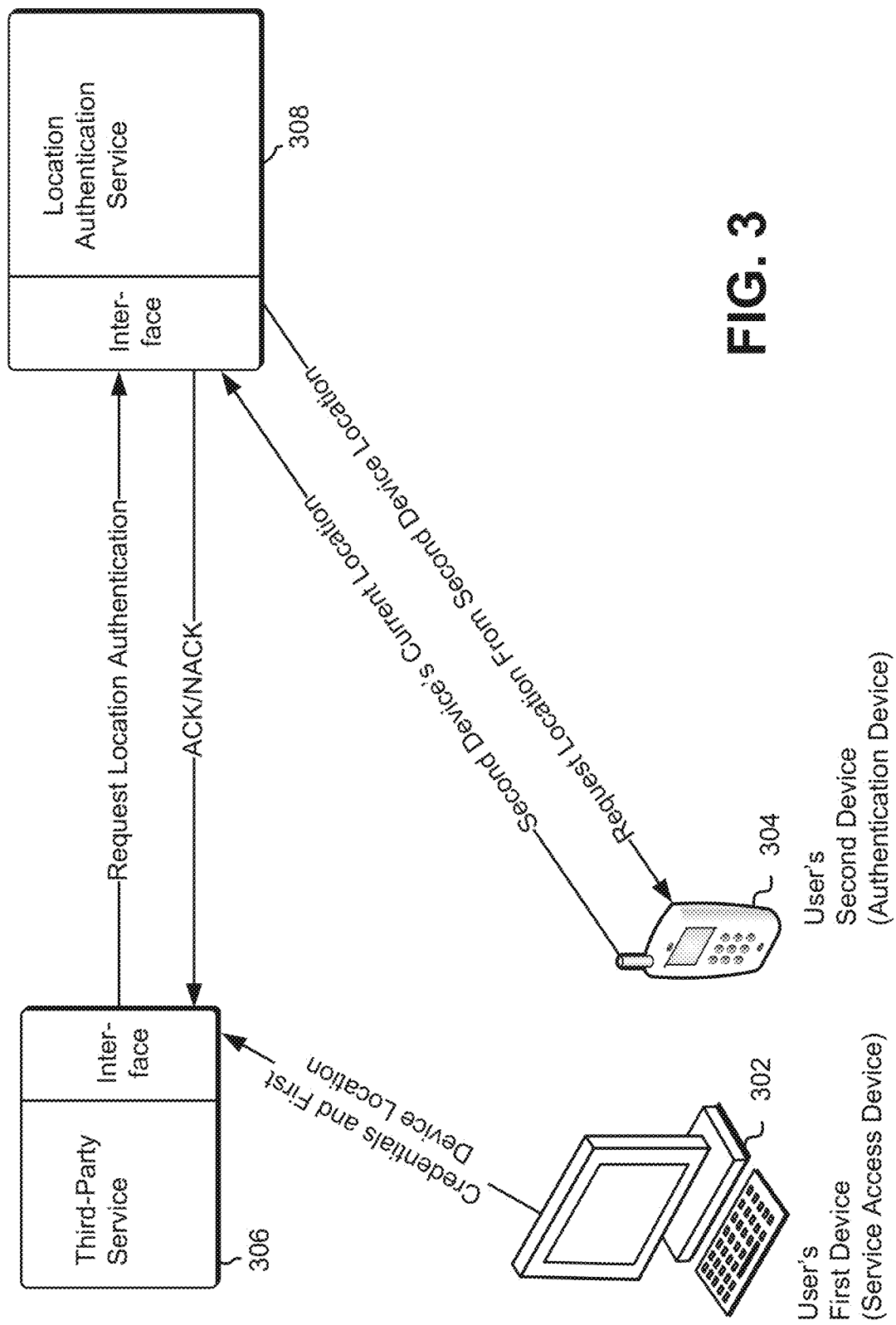
FIG. 3 shows an example of a location authentication service for authenticating a user of a third-party service in accordance with at least one embodiment.

FIG. 3 shows an example of a location authentication service for authenticating a user of a third-party service in accordance with at least one embodiment. A user having two devices (a first device 302 and a second device 304) attempts to log on or access a third-party service 306 using the first device. The user is authenticated based at least in part on a location of the first device 302 and a location of the second device 304. Authenticating the user based at least in part on the location of the first device 302 and the location of the second device 304 is facilitated by a location authentication service 308.

The third-party service 306 may be any type of service that provides functionality to the user and may require verification of user credentials prior to the user gaining access to the service or gaining access to information or data specific to the user. The third-party service 306 may be an electronic service and may communicate with the user or with other services, such as the location authentication service 308 via a network (not shown), whereby the communication is facilitated by a communications protocol, such as the Internet protocol (IP). The third-party service may, for example, be a social networking website, an e-mail service or an electronic banking service. The term "third-party" is used herein in reference to the relationship of the service with the location authentication service 308 to which the user may be deemed to be a second party. However, other terms may also be used to aptly describe the service including social networking service or e-commerce service or website. As described herein, the third-party service 306 may require a user to be authenticated before the user is permitted access to the third-party service 306 or access to a functionality of the third-party service 306. Further, although the third-party service 306 and the location authentication service 308 are shown as being decoupled in FIG. 3, the third-party service 306 and the location authentication service 308 may be part of the same entity or service and the location authentication functionality of the location authentication service 308 may be performed by the third-party service 306 or any other service. As described herein, the term "third-party" is illustrative and the techniques may be used in other contexts where resources and authentication are controlled or performed by the same entity.

The user's first device 302 may be any electronic device that is configured to communicate with the third-party service 306 using any type of communication protocol. The first device 302 may be equipped with a processor, such as a central processing unit (CPU) or a graphics processing unit (GPU), that provides computing functionality to the user. Examples of a CPU include those utilizing a complex instruction set computing (CISC) architecture, such as the x86 CPU, and others that utilize a reduced instruction set computing (RISC) architecture, such as the advanced RISC machine (ARM) CPU. The first device 302 may also be equipped with one or more input and output peripherals, such as a screen, speakers and touch screen or physical keyboard. The first device 302 may further be equipped with a global positioning system (GPS) circuitry that enables locating the device. The first device may further be equipped with an operating system and may be configured to execute software applications and programs compatible with the operating systems. Examples of the programs include a hypertext markup language 5 (HTML5) web browser that enables access to websites over a network and is capable of providing location of the device and vendor-specific applications that enable access to vendor-provided services, such as mobile applications.

The user's second device 304 may be any device that is configured to communicate with the location authentication service 308. Further, the second device 304 may be similarly configured as the first device 302 and may be equipped with any type of hardware or software functionality. The first device 302 or the second device 304 may be any consumer electronic device including a desktop computer, a laptop computer, an Internet-enabled smart television, a smart phone or a tablet. The first device 302 or the second device 304 may access the third-party service 306 or the location authentication service 308 via one or more networks (not shown), whereby the network may be the Internet, an intranet or an Internet service provider (ISP) network. Communication between the user and the third-party may be performed using any type of protocol, such as an Internet protocol (IP).

The location authentication service 308 may be configured to authenticate a user or a user's device (such as, the first device 302) based at least in part on a location of the user's device or a location of another device (such as, the second device 304) of the user. The location authentication service 308 may be equipped with computing resources to facilitate user or device authentication. The computing functionality may include processing power derived from underlying physical or virtual hardware resources.

The user may have an account with the third-party service 306 through which the user may gain access to the third-party service 306 or a user's account with the third-party service 306. The third-party service 306 may authenticate the user based at least in part on the user's credentials. Confirming the user's credentials may include matching the name associated with the user (such as an e-mail address or a user-specified or a service-specified name) and a password or personal identification number (PIN) associated with the user. In addition to or in place of authenticating the user based at least in part on the user's credentials, location authentication may be used, whereby the user may authenticated for access to the third-party service 306 may include location authentication as described herein. The user may be said to be authenticated for access to the third-party service 306 if the user's credentials are authenticated, the user's location is authenticated both the user's credentials and the user's location are authenticated. As described herein, authenticating the user's location may be enabled by the location authentication service 308.

As shown in FIG. 3, the user attempts to access the third-party service using the first device 302 (also referred to herein as a service access device). The user may send their credentials to the third-party service 306 for the authentication process to be performed. The third-party service 306 may authenticate the user based at least in part on their credentials and may initiate authenticating the user based at least in part on the user's location. In order for location authentication to be performed, the third-party service 306 may receive a location of the first device 302 and may request the location authentication service 308 to perform location authentication based at least in part on the location of the first device 302. The location authentication service 308 may obtain the location of the second device 304. As described herein, the second device 304 may be a mobile device. The location authentication service 308 may request, from the second device 304, the location of the second device 304 and the second device 304 may respond with it's current location to the location authentication service 308. The location authentication service 308 may determine whether the user may be authenticated based at least in part on the location of the first device 302 and the location of the second device 304. Authenticating the user may be based at least in part on the premise that the first device 302 and the second device 304 are on the user's person or near the user's person, in the user's home or in the user's office, among others. Further, authenticating the user may include determining whether the two device 302, 304 are within a geographic proximity to one another or whether the first device 302 is within a geographic boundary of the second device 304 and vice-versa.

Upon determining whether the user's location may be authenticated, the location authentication service 308 may send an acknowledgement to the third-party service 306 indicating that the location authentication of the user has been successful or a non-acknowledgement indicating that the location authentication has not been successful.

Figure 4:
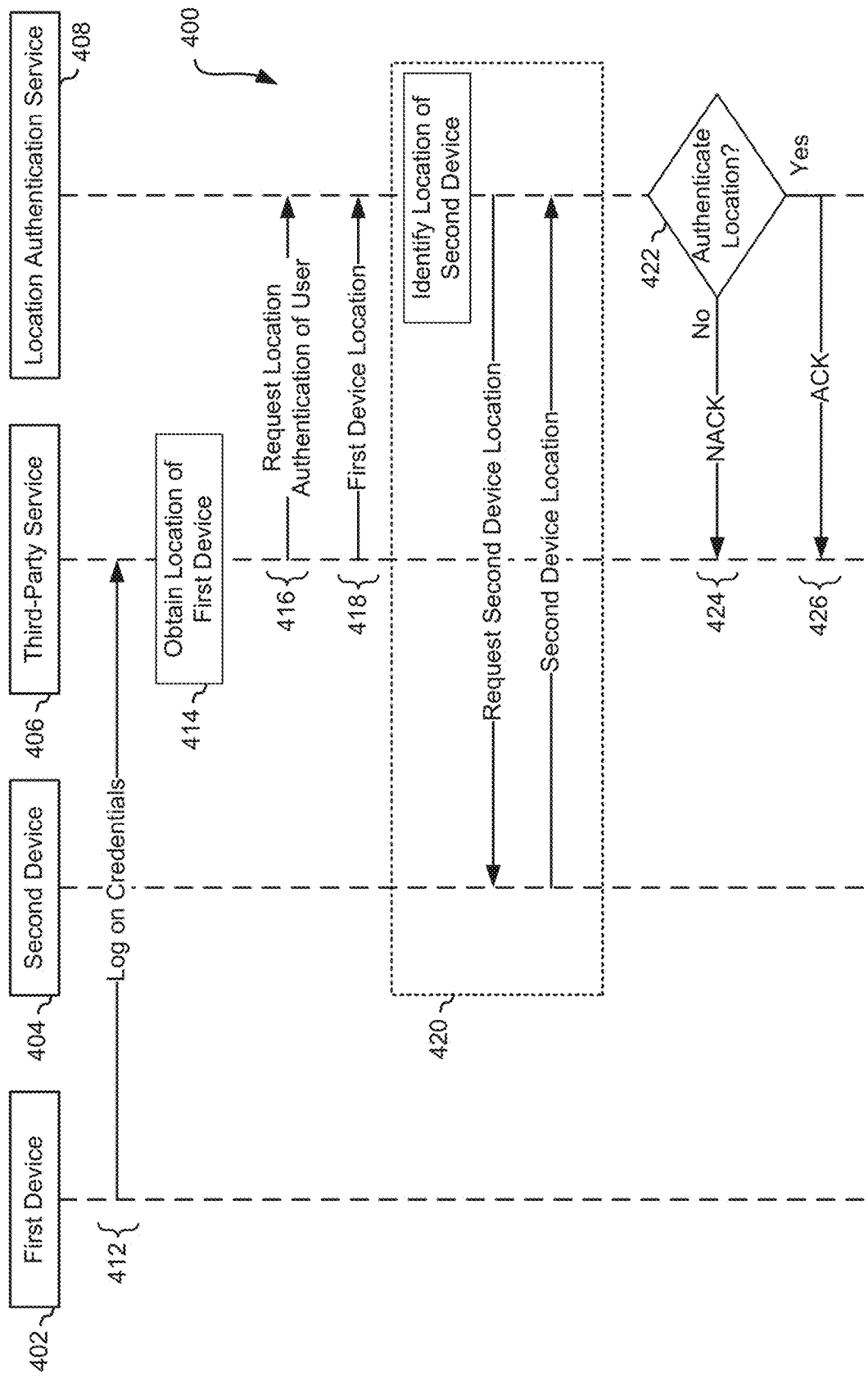
FIG. 4 shows an example message diagram for a method for authenticating a user based at least in part on the user's location in accordance with at least one embodiment.

FIG. 4 shows an example message diagram for a method for authenticating a user based at least in part on the user's location in accordance with at least one embodiment. In the process 400, a user has a first device 402 for accessing a third-party service 406 and a second device 404 for enabling location authentication by a location authentication service 408. The user utilizes the first device to send 412 log on credentials the third-party service 406. Prior to initiating logging on to the third-party service 406, the user may have created an account with the third-party service 406, whereby the user or the third-party may have set the user's credentials. The credentials may include one or more identifiers associated with the user, such as a user name, a password, a PIN, a date of birth or answers to security questions. The user may send one or more credentials or identifiers associated with the user to the third-party service 406 to complete the credential authentication portion of the authentication process. The third-party service 406 may authenticate the user based at least in part on the credentials. Alternatively, the third-party 406 may determine that the user's credentials cannot be authenticated and may request the user to resend the credential in case an error in providing the credentials has occurred.

In addition to or in place of confirmation of the received user's credentials, granting access to the user's account with the third-party service 406 to the first device 402 may include location authentication. As described herein, location authentication may include granting access to the third-party service 406 based at least in part on a location associated with the user or one or more of the user's devices. Authenticating the user may include confirming that two or more devices of the user share a common location or are within a geographic proximity to one another. Further, location authentication may include confirming that the user attempts access to a service from a trusted geographic location.

To perform location authentication, the third-party service obtains 414 the location of the first device 402. Obtaining the location of the user's first device 402 may be performed by obtaining a Global Positioning System (GPS) location of the first device 402. For example, the first device 402 may be equipped with GPS circuitry that enables locating the first device 402 using GPS. The first device 402 may be aware of its location as determined by the GPS and may send the location to the third-party service 402. Alternatively, the third-party service 406 may obtain the location of the first device 402 from a location service associated with the GPS.

Further, obtaining the location of the user's first device 402 may be performed using web browser-supported geolocation estimation. A web browser that supports hypertext markup language 5 (HTML5) may enable estimating and providing the device's location to a service accessed by the web browser. Estimating a device's location may be performed based at least in part on an Internet protocol (IP) address that the devices, an identity associated with a used wireless network connection or a wireless access point or an identity associated with a wireless network connection or wireless access point that is visible to the device, among others. Examples of the wireless network connection or wireless access point include those compliant with an Institute for Electrical and Electronics Engineers (IEEE) 802.11 communications protocol.

The third-party service 406 may be accessible via the web browser (for example, a web browser using an HTML 5 protocol) and the user of the first device 402 may be prompted to provide the location of the first device 402 to the third-party service 406. The user may opt-in for providing information associated with the location of the first device 402 to the third-party service 406. Upon identifying the location of the first device 402, the process 400 proceeds to location authentication. As described herein, the user may be authenticated by confirming that the user's first device 402 is within a geographic proximity to a second device 404 of the user. For example, the first device 402 may be a computer of the user and the second device 404 may be a mobile phone of the user and it may be assumed that the user will likely have their mobile phone in their proximity.

The location authentication service 408 is used to authenticate the location of the user. The third-party service 406 sends 416 a request to authenticate the location of the user to the location authentication service 408. The request may include identifying information of the user, such as an identity of account of the user with the third-party service 406 or an identity of an account of the user with the location authentication service 408. The third-party service 406 also sends 418 the identified location of the first device 402 to the location authentication service 408. The location authentication service 408 then attempts to confirm that the location of the user's first device 402 is within a geographic proximity to the user's second device 404.

The location authentication service 408 may identify the user based at least in part on the received identity of the user. The location authentication service 408 may also identify one or more devices that are to be used for authenticating the user's location. The location authentication service 408 may maintain identities of third-party services that may request location authentication for the user as well as user devices whose location may be used for location authentication. The user, for example, may specify that the user's mobile phone or smart phone be used for location authentication as it may be assumed that the user may have their mobile phone or smart phone on their person in most cases the user attempts access to a third-party service.

The location authentication service 408 then obtains 420 a location of the user's second device 404. Obtaining the location of the second device may be performed by sending a message to the second device 404 requesting the location of the second device 404. The message may inquire the location of the second device 404 and may solicit the second device 404 to send its current location to the location authentication service 408. As contemplated by those skilled in the art, the second device 404 may determine its location based at least in part on a GPS location of the device, among other means for determining location. The second device 404 may send its location to the location authentication service 408. The location may be provided as a tuple including: [latitude, longitude, altitude]. The latitude specifies a north-south position of a point on the Earth's surface, the longitude specifies an east-west position of a point on the Earth's surface and the altitude may be a height above sea level of a location. Further, the time at which the position of the second device 404 was measured may also be provided to the location authentication service 408.

Upon receipt of the location of the second device 404, the location authentication service 408 attempts to authenticate the location of the user. The location authentication service 408 may make a comparison between the location of the first device 402 as received from the third-party service 406 and the location of the second device 404 and may determine 422 whether the user's location may be authenticated. Determining whether the user's location may be authenticated may include determining the locations of the first device 402 and the second device 404 are within a geographic proximity of one another. To determine whether the locations are within a geographic proximity of one another, the location authentication service 408 may determine whether the location of the first device 402 is within a radius of the location of the second device 404 or within a geographic boundary the second device 404 of and vice-versa.

It is noted that the locations of the first device 402 and the second device 404 as received by the location authentication service 408 may be subject to measurement errors or inaccuracies or may have an associated margin of error. Further, the margin of error may depend on the basis of a location measurement, whereby, for example, a GPS-based location measurement may have a smaller margin of error than an IP-based measurement. To account for measurement errors, one or more conditions for geographic proximity between the user's devices may change depending on the technique used to measure the location of the user's devices. Further, proximity between the user's devices may be based at least in part on a percentage of overlap of a geographic boundary around the first device and a geographic boundary around the second device. The geographic boundary may be a circle of a pre-specified radius around the location of a device. The radius may adjustable depending on the technique used to measure the location of a device, whereby the radius may be proportional to the margin of error or inaccuracy associated with the location measurement.

On a condition that the location authentication service 408 is able to authenticate the location of the user, the location authentication service 408 may send 426 an acknowledgement to the third-party service 406 indicating that the location of the user has been successfully authenticated. Conversely, if the location authentication service 408 is not able to authenticate the location of the user, the location authentication service 408 may send 424 an non-acknowledgement to the third-party service 406 indicating failure of location authentication. If the third-party service 406 receives an acknowledgement from the location authentication service 408, the third-party service may consider that the user has been successfully authenticated and that successful proof that the user devices satisfy one or more conditions of geographic proximity has been determined. The third-party service 406 may, accordingly, grant access to the service to the user. If, on the other hand, the third-party service 406 receives an non-acknowledgement from the location authentication service 408, the third-party service 406 may consider that the one or more conditions of geographic proximity have not been satisfied and may deny the user access to the service.

It is noted that the location authentication service 408 may attempt to authenticate the location of the user by comparing the location of the user's first device 402 with two or more devices of the user. For example, in addition to the first device 402 used to access the third-party service 406, the user's may have a mobile phone and a tablet. The location authentication service 408 may authenticate the location of the user by determining that the location of the user's first device is within a geographic proximity to the user's two or more devices.

When performing location authentication, the location authentication service 408 may reconcile two or more different types of positioning standards. Positioning may, in some cases, be based at least in part on a longitude and latitude of a location of a device, whereas, in other cases, positioning may be based at least in part on a longitude, latitude and altitude of a location of the device. To compare the locations of two devices, the location authentication service 408 may compare the longitude and latitude of the locations of the two devices and discount the altitude from location authentication if altitude data is not available for both devices. If it noted that altitude location is often available in GPS-based location measurements but may be absent in an HTML5-based location estimation which relies on IP addresses and wireless communications access points for altitude information may be lacking. It is further noted that the location authentication service 408 is advantageous in that it is decoupled from the third-party service 406. The decoupling enables location authentication to be performed more securely as using the third-party service 406 for authenticating credentials and using the location authentication service 408 for authenticating location makes the authentication process more resilient to compromise.

Prior to authenticating the user based at least in part on the location of the user devices, an authentication device may be registered as a device of the user or as a device whose location may be used to authenticate the user. Registering the authentication device with location authentication service 408 may include confirming that the authentication device is associated with the user as described with reference to FIG. 5.

Figure 5:
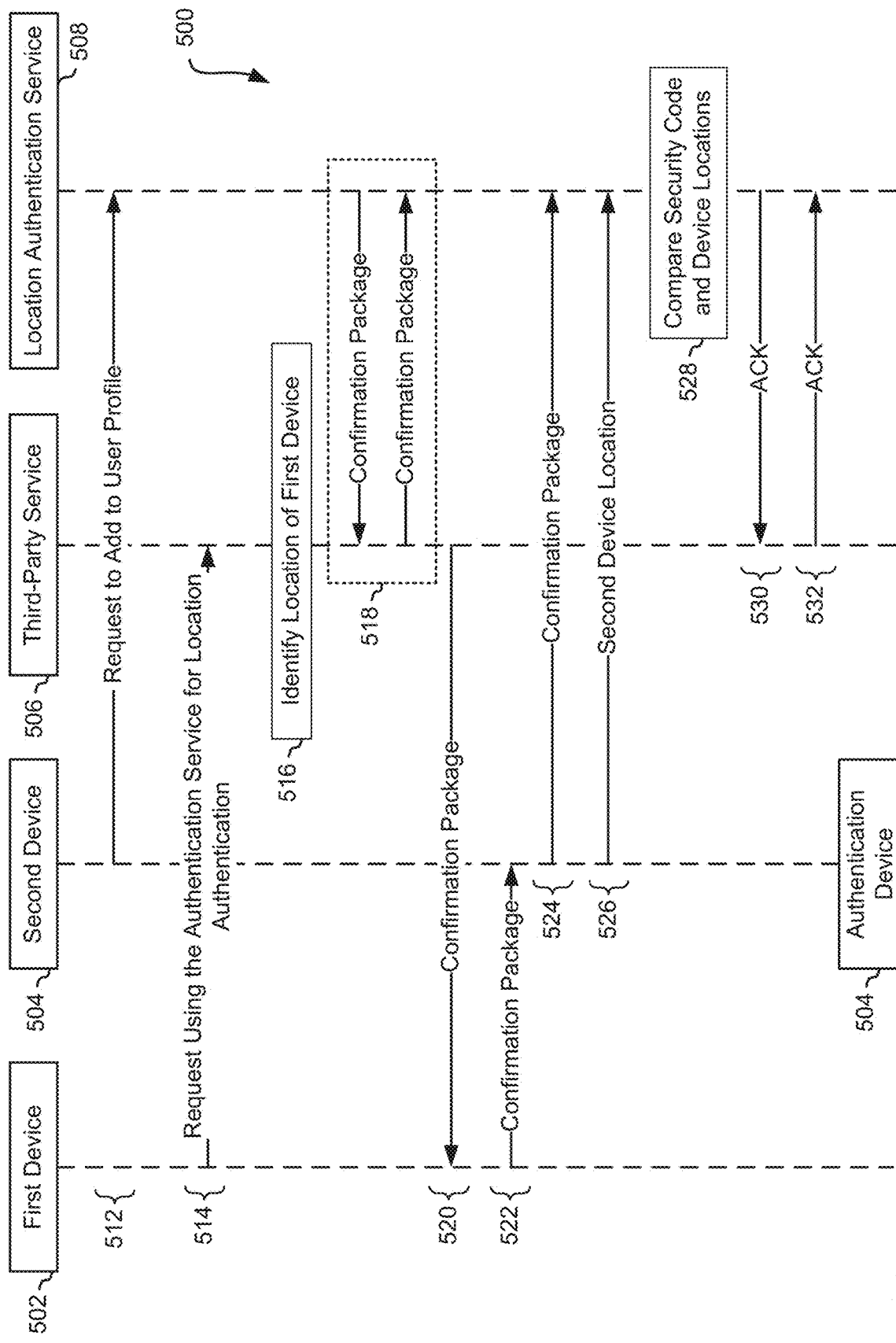
FIG. 5 shows an example of a message flow diagram for registering an authentication device with a location authentication service in accordance with at least one embodiment.

FIG. 5 shows an example of a message flow diagram for registering an authentication device with a location authentication service in accordance with at least one embodiment. A user has a first device 502 using which the user attempts access a third-party service 506 (also referred to herein as a service access device). The user also has a second device 504 which is sought to be registered with a location authentication service 508 in order for the second device 504 to be used when performing location authentication. Following registration, the second device 504 may be referred to as a location authentication device. It is noted although one authentication device is sought to be registered with authentication service 508 as described with reference to FIG. 5, more than one authentication devices may be registered with the location authentication service 508 and may be used for verifying the user's location and authenticating the user.

To register the second device 504 as an authentication device, the user's second device 504 requests 512 the location authentication service 508 to add the second device 504 to a profile of the user maintained by the location authentication service 508. The user profile may include one or more other authentication devices of the user which may be used to authenticate the user for access to one or more third-party service. Further, the user's profile may include an indication of the one or more third-party services which may be accessed by the user and which may request user authentication from the location authentication service 508. The profile may associate an authentication device with a third-party service, whereby the authentication device may be used for authenticating user access to the third-party service.

The user requests 512 adding the second device 504 as an authentication of the user. Adding the second device 504 may be requested by accessing an account of the user with the location authentication service 508 via a web browser. Alternatively, the user may obtain an application that facilitates access to the user's profile with the location authentication service 508. The user may use the application to log on to the user's profile and request adding the second device 504 as an authentication device. Further, the user may indicate the services for which the second device 508 is to be used as an authentication device. For example, the user may have a social networking account and a bank account and the user may seek to designate the user's mobile phone as an authentication device for access to the user's social networking account and designate the user's tablet as an authentication device for access to the bank account. Similarly, the user may designate the mobile device as an authentication device for all of the user's third-party service accounts that use the location authentication service 508 for authentication.

To confirm that the second device is a device of the user and that the user seeks to use the second device 502 as an authentication device for the third-party service 506, the user logs on to the user's account with the third-party service 506 using the first device 502 and requests 514 the third-party service 506 to use the location authentication service 508 for user location authentication. Further, the request may indicate that the second device 504 be used as an authentication device. Upon receipt of the user's request to use the location authentication service 508 for authenticating user location, the third-party service 506 identifies 516 a location of the first device 502. Determining the location of the first device may, for example, be facilitated by an HTML5 browser of the first device 502. The HTML5 browser may supply the location information of the first device 502 to the third-party service 506. The location of the first device 502 will be compared to the location of the second device 504 in order verify that the second device 504 is associated with the user. As a result, for the registration to be completed properly, it may be required for the first device 502 and the second device 504 to be within a predetermined geographic boundary.

A confirmation package including a security code is then relayed for completing the registration procedure. The confirmation package may include a security code, which may be a randomly generated string (for example, a random string of alphanumeric or hexadecimal characters). The security code may be used to authenticate the confirmation package as being initiated or sent by the third-party service 506 or the location authentication service 508. Further, the confirmation package may also include an identity associated with the third-party service 506. In addition, the confirmation package may also include the location of the first device 502 as determined by the third-party service 506 as well as an expiration time or date for adding the third-party service 506 as a service that uses the location authentication service 508 or for adding the second device 504 as an authentication device.

Two alternatives for confirmation package generation are shown in FIG. 5 and described with reference to numeral 518. In a first scenario, the location authentication service 508 generates the confirmation package (including the security code) and sends 518 the confirmation package to the third-party service 506. The third-party service 506 then sends 520 the confirmation package to the first device 502. In a second scenario, the third-party service 506 generates the confirmation package (including the security code) and sends 518 the confirmation package to the location authentication service 508. Further, the third-party service 506 relays the confirmation package to the first device 502 as described herein.

In an embodiment, the elements of the confirmation package may be generated by both the third-party service 506 and the location authentication service 508. For example, the location authentication service 508 may generate the security code and send the security code to the third-party service 506 for relay to the first device 502, whereas the third-party service may add other elements to the confirmation package (such as, an identity associated with the third-party service 506, the location of the first device 502 or an expiration time or date for adding the third-party service 506 as a service that uses the location authentication service 508 or for adding the second device 504 as an authentication device). As described herein, the third-party service may send the augmented confirmation package to the first device 502. The confirmation package or a portion thereof is then relayed from the first device 502 to the second device 504 and used by the location authentication service 508 to confirm that the second device 504 is associated with the user.

The confirmation package may be sent to the first device 502 as a Quick Response (QR) code. Sending the confirmation package as a QR code to the first device 502 facilitates capturing the confirmation package by the second device 504 in the event that the second device is equipped with a camera. As described herein, sending the confirmation package may include sending fewer than all the elements of the confirmation package. For example, the third-party service 506 may send the security code and the location of the first device 502 to the location authentication service 508 but only send the security code to the first device 502.

The confirmation package is then transferred 522 from the first device 502 to the second device 504. Transferring the confirmation package may be performed by physically connecting the two devices and causing the confirmation package to be received by the second device 504 using any appropriate communication protocol, for example, a High-Definition Multimedia Interface (HDMI) communication protocol. Further, transferring the conformation package to the second device may be performed wirelessly through any type of wireless communication protocol including short-range communications protocols, such as Bluetooth™ or IEEE 802, or long-range communications protocols, such as a cellular communications protocol. In addition, the confirmation package may be transferred to the second device 504 by capturing a still image of a QR code representing the confirmation package. Transferring the confirmation package may be facilitated by an application of the location authentication service 508 installed on the second device 504, whereby, for example, the application may enable the second device 504 to capture an image of the QR code representing the confirmation package or the application may enable the second device 504 to communicate with the first device 502 for the purpose for transferring the confirmation package via a wired or wireless connection.

Following receiving the confirmation package, the second device 504 sends 524 the confirmation package to the location authentication service 508. Similar to receiving the confirmation package, sending the confirmation package to the location authentication service 508 may be enabled by an application of the location authentication service 508 that is installed on the second device 504. Before or after receiving the confirmation package from the second device 504, the location authentication service 508 also receives 526 the location of the second device 504. The location of the second device 504 may be determined using GPS when the second device 504 is equipped with GPS circuitry or using HTML5-based location estimation.

The location authentication service 508 then compares 528 the security received from the second device 502 with the security code it retains (for example, the security code it generated or received from the third-party service 506) and determines whether the security code are matching or meet a specified criterion. Further, the location authentication service 508 compares 528 the location of the first device 502 as received from the third-party service 506 with the location of the second device 504. The location authentication service 508 may determine whether the locations of the two devices satisfy a criterion, such as whether one of the devices falls within geographic range of the other device. If one or more of the security code and the location criteria are met, the second device 504 may be verified as a device of the user. Further, the location authentication service 508 may determine whether the time for performing device association has expired and if it is determined that the time has expired, the location authentication service 508 may not verify the second device 504 as a device of the user.

If one or more of the criteria are satisfied, the location authentication service 508 sends 530 an acknowledgement to the third-party service 506 indicating that the second device 504 may be authenticated for use as an authentication device. Further, the acknowledgement may also indicate that the third-party service 506 may use the location authentication service 508 for authenticating the user's location. The third-party service 506 may process the request and may begin using the location authentication service 508 for authenticating the user. The third-party service 506, in turn, responds 532 with an acknowledgement to the location authentication service 508 and the registration process is considered to be completed.

Following the completion of the registration process the third-party service 506 may use the location authentication service 508 for location authentication. Further, the registration process may be repeated for one or more other user devices, whereby the user may seek to register other device for use as authentication devices. If the authentication of the user based on a device is not successful, location authentication based on the one or more other user devices may be initiated to authenticate the user. For example, the user may register their smart television as an authentication device for authenticating the user when accessing the third-party service 506 at home and may register their work Voice over IP (VoIP) phone as an authentication device for authenticating the user when accessing the third-party service 506 at work.

Figure 6:
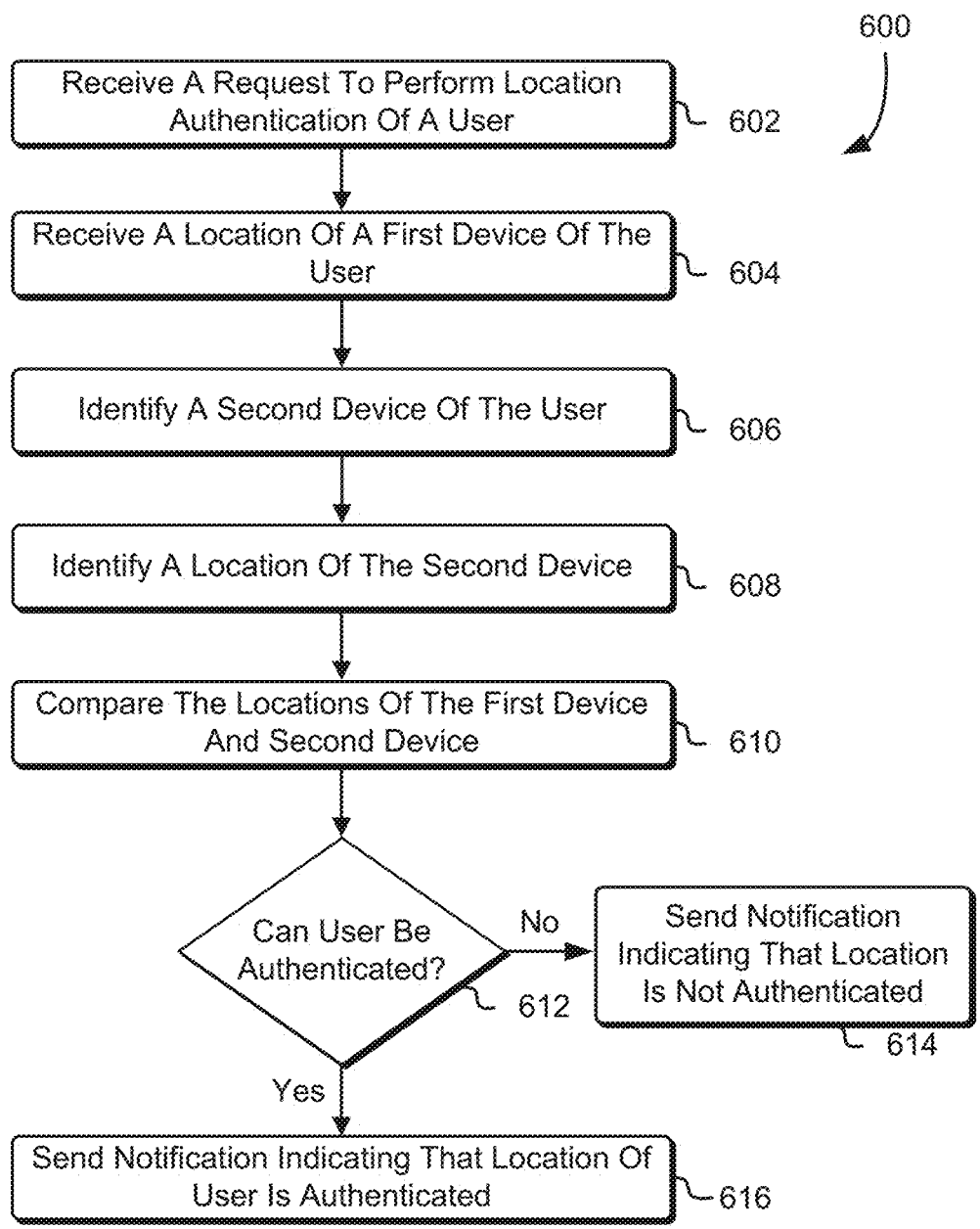
FIG. 6 shows an example of a method for performing location authentication in accordance with at least one embodiment.

FIG. 6 shows an example of a method for performing location authentication in accordance with at least one embodiment. In the process 600, a location authentication service, such as location authentication service 308 described with reference to FIG. 3, receives 602 a request to perform location authentication of a user. An example of the request is described with reference to numeral 416 in FIG. 4. Location authentication may be based at least in part on a location of one or more devices associated with the user. The location authentication service also receives 604 a location of a first device of the user. The location authentication service proceeds to perform location authentication of the user. The location authentication service identifies 606 a second device associated with the user. The identification may be based at least in part on the request and the second device is verified for usage in authenticating the user. The location authentication service identifies 608 a location associated with the second device, for example, as described with reference to numeral 420 in FIG. 4.

The location authentication service then compares 610 the location of the first device and the location of the second device and determines 612 whether the user can be authenticated, for example, as described with reference to numeral 422 in FIG. 4. If a negative determination is made the location authentication service sends 614 a notification indicating that the location is not authenticated. The notification may be a non-acknowledgement as described with reference to numeral 424 in FIG. 4. If a positive determination is made the location authentication service sends 616 a notification indicating that the location is of the user is authenticated. The notification may be an acknowledgement as described with reference to numeral 426 in FIG. 4.

In some embodiments, to guard against a security compromise, the location authentication service may not share the location of the authentication device with the third-party service or other user devices. Further, in other embodiments, the location authentication service may employ facial recognition for authenticating a user. The location authentication service may retain an image file associated with the user as part of the user's profile, such as a portrait of the user. To authenticate the user, the location authentication service may require that a device of the user send an image of the user to the location authentication service. The location authentication service may compare the image of the user retained by the location authentication service to the image provided by the user's device. The retained image may be different from the received image and when the images are compared a variance between the two images may be determined. One or more criteria may be set to determine whether the user may be authenticated based at least in part on the received image. Facial and image recognition may be used in addition to or in place of location authentication for authenticating the user.

Figure 7:
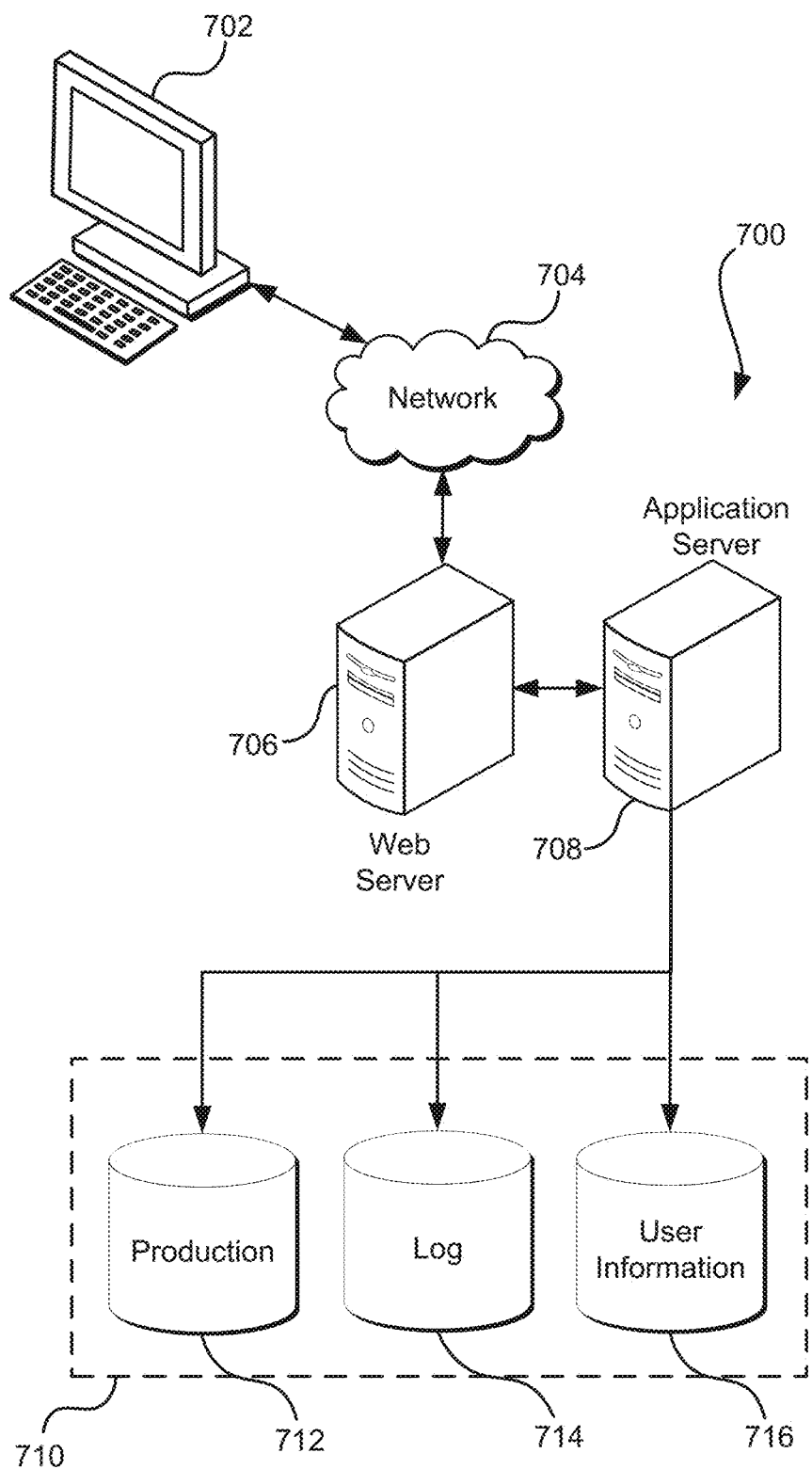
FIG. 7 illustrates an environment in which various embodiments can be implemented.

FIG. 7 illustrates aspects of an example environment 700 for implementing aspects in accordance with various embodiments. As will be appreciated, although a web-based environment is used for purposes of explanation, different environments may be used, as appropriate, to implement various embodiments. The environment includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling some (even a majority) of the data access and business logic for an application. The application server may provide access control services in cooperation with the data store and is able to generate content such as text, graphics, audio and/or video to be transferred to the user, which may be served to the user by the web server in the form of HyperText Markup Language ("HTML"), Extensible Markup Language ("XML") or another appropriate structured language in this example. The handling of all requests and responses, as well as the delivery of content between the client device 702 and the application server 708, can be handled by the web server. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed system.

The data store 710 can include several separate data tables, databases or other data storage mechanisms and media for storing data relating to a particular aspect of the present disclosure. For example, the data store illustrated may include mechanisms for storing production data 712 and user information 716, which can be used to serve content for the production side. The data store also is shown to include a mechanism for storing log data 714, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining, from a first device, a request to register a second device as an authentication device;
   determining that the first computing device and the second computing device satisfy a set of conditions that is based at least in part on proximity of the first computing device to the second device; and
   transmitting a code to the first computing device, wherein the code is usable by the second device to complete registration of the second device.

2. The computer-implemented method of claim 1, further comprising:
   obtaining a second code from the second device; and
   verifying that the second code matches the code sent to the first device.

3. The computer-implemented method of claim 1, wherein the code is a randomly generated sequence of characters.

4. The computer-implemented method of claim 1, further comprising:
   verifying that the second device has access to the code; and
   transmitting an acknowledgment to a service that the second device is registered as an authentication device.

5. The computer-implemented method of claim 1, wherein the code is transmitted in a package with other information to be used to register the second device as an authentication device.

6. The computer-implemented method of claim 5, wherein the package comprises information associated with the first device.

7. The computer-implemented method of claim 1, wherein the set of conditions are satisfied by the first device and second device being within a predetermined boundary.

8. A system, comprising:
   one or more processors; and memory including instructions that, as a result of being executed by the one or more processors, cause the system to:

obtain information comprising: a first location of a first device, a second location of a second device, and a first code obtained from the second device;

determine whether the first location and the second location match;

determine whether the first code matches a second code that was transmitted to the first device; and register the second device as an authentication device as a result of the first location matching the second location and the first code matching the second code.

9. The system of claim 8, wherein the first code and second code match by being equal.

10. The system of claim 8, wherein:
the code is obtained in a package of information that indicates an expiration; and
registration of the second device requires the first code to be unexpired.

11. The system of claim 8, wherein the instructions further cause the system to transmit the first code to a service to cause the service to transmit the first code to the first device.

12. The system of claim 11, wherein the second code is obtained from the second device without involvement of the service.

13. The system of claim 8, wherein the first location and the second location match by satisfying a set of proximity conditions.

14. The system of claim 13, wherein the set of proximity conditions are satisfied by the first location being within a predefined distance from the second location.

15. A non-transitory computer-readable storage medium storing thereon executable instructions that, as a result of being executed by one or more processors of a computer system, cause the computer system to:

determine whether a first location of a first application matches a second location of a second application;

determine whether a second code obtained from the second application matches a first code sent to the first application; and as a result of the first location matching the second location and the first code matching the second code, cause the second application to be usable for authentication.

16. The non-transitory computer-readable storage medium of claim 15, wherein the instructions further cause the computer system to send the first code to the first application.

17. The non-transitory computer-readable storage medium of claim 15, wherein the first location matches the second location as a result of the first location being within a predetermined distance from the second location.

18. The non-transitory computer-readable storage medium of claim 15, wherein the instructions further cause the computer system to transmit an indication of the second application being usable for authentication to a service accessible by the first application.

19. The non-transitory computer-readable storage medium of claim 15, wherein the instructions further cause the computer system to provide the first code in a first form and obtain the second code in a second form.

20. The non-transitory computer-readable storage medium of claim 19, wherein the first form encodes the first code to be optically scannable.

21. The non-transitory computer-readable storage medium of claim 15, wherein the instructions further cause the second application to be usable for authentication of a third application.

* * * * *